Nov. 10, 1964     E. W. ROLL     3,156,327
VEHICLE BRAKE AIR COOLING DEVICE
Filed Dec. 10, 1963
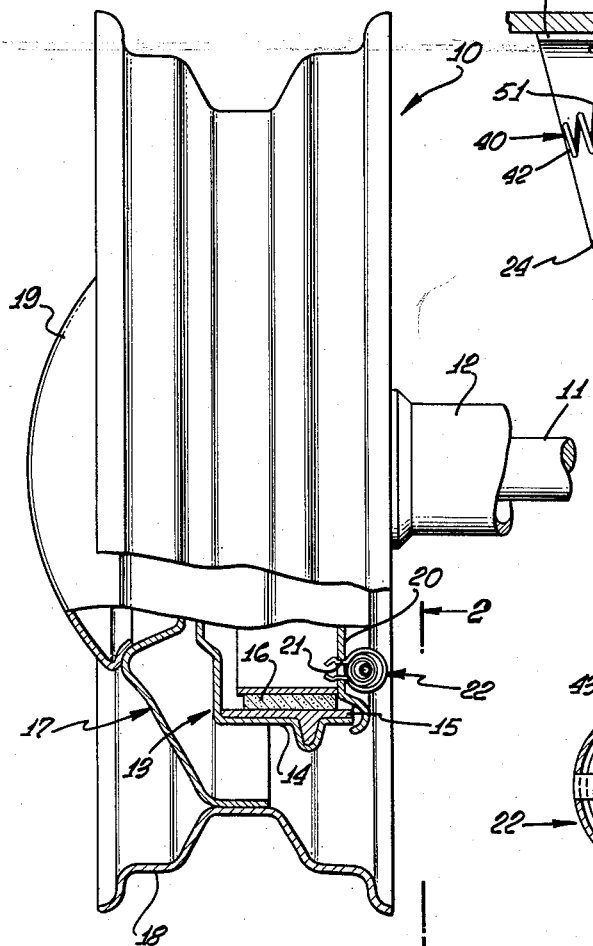
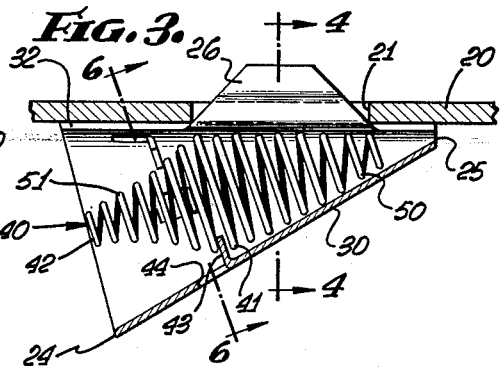
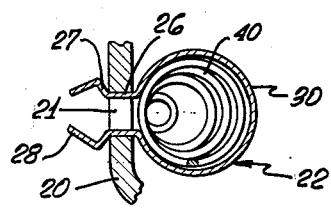
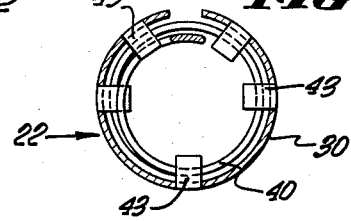
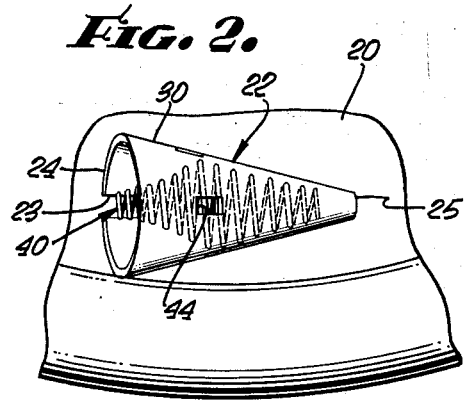
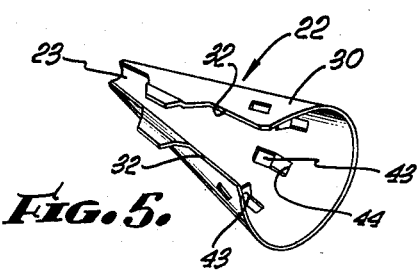
INVENTOR.
EDMOND W. ROLL
BY
Bernard Kriegel
ATTORNEYS

United States Patent Office 3,156,327
Patented Nov. 10, 1964

3,156,327
VEHICLE BRAKE AIR COOLING DEVICE
Edmond W. Roll, 320 E. Walnut, Kokomo, Ind.
Filed Dec. 10, 1963, Ser. No. 329,548
12 Claims. (Cl. 188—264)

The present invention relates to cooling of brakes, and more particularly to the cooling of vehicle brakes, such as embodied in automobiles and trucks.

The brakes of automobiles, trucks, and similar vehicles, generate considerable heat when applied, which is not dissipated in its entirety after cessation of brake application, and despite continuing motion of the vehicle. Even without application of the brakes, heat is generated between the brake shoes and each companion brake drum because of the existence of some, although light, frictional engagement between the parts. As a result, the coengaging brake parts remain at an elevated temperature, not only reducing the effectiveness of the brakes, but, sometimes, resulting in their "fading" or other undesirable conditions.

It has been proposed to alleviate the condition noted by providing a device that relies upon the motion of the vehicle for discharging or sucking ambient air into the interior of the vehicle brake system to cool all of the brake parts, and particularly the friction contacting brake members themselves. Although the brake mechanism is cooled effectively, at times, the device also serves to collect foreign matter, such as pebbles, dirt and water, which are injected into the brake mechanism, with potential adverse affect upon it.

An object of the present invention is to provide a device for directing ambient air into the brake mechanism of a moving vehicle, in which solid particles, such as pebbles and dirt, are prevented from entering the brake mechanism through the device.

Another object of the invention is to provide a device for directing ambient air into the brake mechanism of a moving vehicle, in which entry of water through the device into the brake mechanism is substantially prevented, the amount that does enter being insignificant and incapable of adversely affecting brake operation.

A further object of the invention is to provide an air scoop device for directing ambient air into the brake mechanism of a moving vehicle, which embodies a baffle or deflector that prevents entry of foreign matters through the device into the brake mechanism, without impairing passage of adequate air through the device to effect brake cooling.

Another object of the invention is to provide an air scoop for directing ambient air into the brake mechanism of a moving vehicle, the scoop being readily inserted into assembled relation to the vehicle brake mechanism and embodying a deflector or baffle for minimizing passage of foreign substances into the brake mechanism, such deflector or baffle assisting in the retention of the air scoop in assembled relation to the brake mechanism.

An additional object of the invention is to provide an air scoop for directing ambient air through the backing plate of a brake mechanism of a moving vehicle into the brake mechanism, and embodying a deflector or baffle for minimizing passage of foreign substances through the deflector or baffle into the brake mechanism, the deflector or baffle functioning as a sound dampener for the backing plate.

Yet a further object of the invention is to provide an air scoop for directing ambient air into the brake mechanism of a moving vehicle, the scoop embodying a deflector for baffling passage of foreign substances through the scoop into the brake mechanism, the deflector being self-cleaning to prevent accumulations of dirt, or the like, from restricting air flow through the scoop.

Another object of the invention is to provide an air scoop for directing ambient air into the brake mechanism of a moving vehicle and embodying a baffle or deflector that is easily mounted in and retained in place in the main portion of the air scoop.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is an elevational view, with a portion in cross-section, of a wheel and brake structure embodying the invention;

FIG. 2 is a side view of a lower portion of the mechanism shown in FIG. 1;

FIG. 3 is a cross-section taken along the line 3—3 on FIG. 2;

FIG. 4 is a cross-section taken along the line 4—4 on FIG. 3;

FIG. 5 is an isometric view of the main portion of an air scoop embodying the invention, and adapted to be mounted on the backing plate of a brake mechanism to direct air thereinto;

FIG. 6 is a cross-section taken along the line 6—6 on FIG. 3.

A vehicle wheel 10 is disclosed in the drawings, which is suitably attached to an axle 11 carried by a suitable housing or support 12, in a known manner. A brake drum 13 is attached to the wheel by suitable fastening devices (not shown). It includes a brake drum ring 14 which may be provided with a liner 15 to be engaged by the brake shoes 16 of the brake mechanism.

The vehicle wheel 10 may include a wheel body 17 permanently affixed to a wheel rim 18 on which a pneumatic tire (not shown) is to be mounted in a known manner. The wheel body 17 is suitably detachably secured to a hub (not shown) fixed to the axle 11, as by cap screws or bolts (not shown), the attaching means being enclosed by a suitable hub cap 19 releasably attached to the wheel body 17.

The brake mechanism is supported on a backing plate 20 suitably attached to the housing or support 12. To enable the brakes to be adjusted, an access opening or hole 21 is provided in the backing plate, usually at its lower portion, to enable a suitable tool (not shown) to be inserted through the opening or aperture for application to the brake mechanism in effecting its adjustment.

During operation of the vehicle, the brakes are applied, as needed, in retarding or stopping its motion. Such action generates heat because of the frictional engagement between the brake shoes 16 and brake drum liner 15. During non-application of the brakes, the brake parts, and particularly the liner and the brake shoes, will cool to some extent, but the parts will, nevertheless, remain at an elevated temperature, which is deleterious to the effectiveness of the brakes and their life. In fact, the brakes may fail due to their temperature rising to a high level.

As shown in the drawings, the brakes are cooled by causing air to be forced into an air scoop 22 during forward motion of the vehicle, the air scoop being mounted in the opening 21 in the backing plate and adapted to discharge the air into the interior of the brake mechanism. As shown, the air scoop is made of spring-like material, such as sheet steel, which is split along one longitudinal portion 23 from end to end. The main body 30 of the scoop or clip 22 tapers from its forward end 24 to its rearward end 25, being of generally conical shape, the large forward end 24 presenting a substantial size opening for the entry of air; whereas, the rearward or smaller end 25 of the body may be closed or substantially closed. Extending laterally outwardly of the body on opposite sides of its split 23 are a pair of opposed arms 26, each of which merges into an outwardly directed flange 27 inclined to the arms, each of these flanges, in turn, merging into a guide finger 28. Thus, the flanges 27 diverge with respect to each other in a direction outwardly of the main body 30 of the air scoop or clip, the fingers 28 converging toward each other in a direction outwardly of the main body of the air scoop.

The arms 26 have a length slightly less than the length of the aperture 21 in the backing plate 20, the body 30 of the air scoop itself having an overall length substantially greater than the length of the arms. The flanges 27 and fingers 28 may be shorter than the arms. The extension of the rear portion of the body substantially beyond the arms 26 results in the body converging sufficiently to provide a substantially closed rearward end 25.

The air scoop is readily inserted in the backing plate by grasping the body portion 30 on opposite sides of the longitudinal split 23 and forcing the arms 26, flanges 27 and fingers 28 toward each other to a position in which such elements can enter the backing plate aperture 21. The tapering of the forward fingers 28 facilitates such action. The arms, flanges and fingers are moved inwardly of the backing plate to the extent in which the flanges 27 are at the inner side of the backing plate 20 and the arms 26 are disposed within the aperture 21. Since the air scoop 22 is made of spring-like material, following insertion of the above-described elements through the aperture and release of the contracting force on the body 30, the arms 26, flanges 27 and fingers 28 spring outwardly, with the flanges 27 extending upwardly and downwardly of the sides of the aperture, to prevent inadvertent removal of the air scoop from the backing plate. The arms 26 themselves preferably have a lateral extent but slightly greater than the thickness of the backing plate 20, so that the longitudinal edges 32 of the body 30 on opposite sides of its split 23 will be closely adjacent to and lies snugly against the outer side surface of the backing plate 20, the flanges 27 being disposed closely adjacent to and engaging the inner surface of the backing plate. The arms 26 themselves, where they join the main body 30 of the scoop, preferably have a length just slightly less than the length of the aperture 21 to prevent any substantial fore and aft movement of the scoop with respect to the backing plate.

One air scoop is preferably mounted on the backing plate of each wheel of the vehicle to which a braking action is applied. During the forward motion of the vehicle, the outside or ambient air enters the forward end 24 of the scoop and is directed by its tapered wall toward the air passage defined between the arms 26, flowing therefrom into the interior of the brake mechanism. The cooler outside air contacts the brake elements, including the shoes 16 and the liner 15, and effects their cooling. The edges 32 of the scoop lie closely adjacent to the backing plate 20 to minimize the loss of air between such edges and the exterior of the plate; whereas, the rear portion 25, which is substantially the apex of the tapered scoop body 30, is substantially closed and will permit very little air to escape therefrom.

The greater the forward speed of the vehicle, the greater will be the quantity of air flowing into the large forward end 24 of the scoop, the air being forced at an increasing velocity through the smaller area air passage between the arms 26 and into the interior of the brake mechanism. The velocity at which the air is discharged to the interior of the drum insures its distribution throughout the brake drum 13 to cool all of its parts. The stream of air is also effective in blowing out dust, dirt, and other undesirable particles that might be present, or which might tend to develop in the brake mechanism as a result of operation of the vehicle and application of the brakes themselves. Thus, not only are the brakes kept comparatively cool, but also in a clean condition, which enhances the effectiveness of the brakes in arresting movement of the vehicle.

Under some road conditions of operation of the vehicle embodying the brake mechanism with the air scoop assembled thereon, foreign substances, such as pebbles, dirt or water, may enter the large end 24 of the scoop and be forced through the access opening or hole 21 into the brake mechanism. The entry of such foreign substances in any significant amounts is prevented in the present instance by incorporating a deflector or baffle member 40 in the body 30 of the air scoop. As shown, the deflector or baffle member consists of a coil spring, and more specifically a conical coil or helical spring, having a base portion or large end 41 contacting the inner wall of the body of the air scoop intermediate its ends and its small end 42 disposed at the mouth or entrance 24 of the air scoop. The pitch between adjacent spring turns is substantially greater than the diameter of the wire from which the helical spring is wound to provide large helical openings through which air can pass between the turns to the interior of the spring for continued flow between the arms 26 of the scoop and into the interior of the brake mechanism.

The spring 42 is retained in place by striking circumferentially spaced tabs or fingers 43 inwardly from the body of the air scoop which overlap a turn or turns of the spring at its larger end 41. The tab or tabs 43 are disposed forwardly of such large diameter turns and retain such turns inwardly toward the small end of the air scoop body 30 and in intimate contact therewith. In view of the tapered inner wall of the air scoop, the spring 42 cannot move rearwardly therein, the tabs 43 preventing forward movement of the spring. Accordingly, the spring is firmly retained in place, both by the main body 30 of the air scoop and by its tabs 43.

During forward motion of the vehicle, ambient air can pass readily through the large end 24 of the air scoop and between the turns of the conical helical spring 42 into the interior thereof and then through the access opening or hole 21 in the backing plate into the brake mechanism. In the event that foreign substances, such as pebbles, dirt or water, enter the large end of the air scoop, they will strike the turns of the coil spring 42 and be deflected laterally outwardly of the spring and against the wall of the body of the air scoop. Such foreign substances may drop to the lower portion of the air scoop body and out through the openings 44 in the body of the latter formed by the inward bending or striking of the body tabs or fingers 43. Adjacent turns of the spring may slightly overlap one another, so that there is no straight-through longitudinal path to the interior of the spring between turns. Foreign substances, such as water, strike such turns and are deflected laterally to one side. Thus, the foreign substances are prevented from being collected by the air scoop 22 and from being forced through the opening 21 in the backing plate into the brake mechanism.

The specific baffle or deflector spring 42 illustrated is of a double conical helical type, including an outer conical helical spring, as described above, and an inner conical spring portion 50 integral with the forward portion 51, and, in fact, forming a continuation thereof, having its large end or base portion 41 common to the large end or base portion of the forward spring portion. The taper of the rear spring portion may conform to the taper of the main body 30 of the air scoop, its turns lying snugly thereagainst. The pitch between adjacent turns of the rear conical coil spring portion 50 may be much greater than the pitch of the forward portion 51 to allow large spaces therebetween through which air can flow from the interior of the forward portion 51 into the interior of the rearward portion 50 and then outwardly between the turns of the latter into and through the access opening or hole between the opposed arms 26 of the air scoop.

The spring deflector 42 is assembled by placing it in the air scoop body 30, with the common base portion or large end 41 immediately behind the tabs 43. The inner or rearward portion 50 engages the tapered wall of the body 30 and will substantially center the spring deflector device within the latter. The body portions on opposite sides of its split 23 are then pressed together to substantially close the split, and the fingers 28, flanges 27 and arms 26 inserted through the access opening or hole 21 of the backing plate, to assemble the air scoop to the latter in the manner described above, whereupon the force is released. The double conical helical spring 42 is so dimensioned that the compression of the air scoop body 30 on opposite sides of its split 23 also exerts a compressive and contracting force on the helical spring 42, the inner conical helical portion 50 of the spring bearing against the inner wall of the body of the air scoop in snug fashion. The base portion 41 will have been contracted by the act of compressing the body 30 thereagainst, and will constantly tend to expand and exert an outward force on the body 30, tending to shift its arm portions 26 away from one another, and thereby add its spring force to the inherent spring force of the body itself in retaining the arms 26 against the upper and lower sides of the backing plate access opening 21. The tendency of the spring 42 to expand not only retains the air scoop 22 in the backing plate, but also acts as a sound dampener for the backing plate itself.

During the forward motion of the vehicle, the forward portion 51 of each spring is free to deflect under the action of the ambient air passing into the scoop, which tends to vibrate the forward portion and prevent dirt, and other foreign substances, from accumlating on and between the spring turns. The continuing vibration of the forward portion 51 makes it self-cleaning, insuring a large open area between its turns or coils through which air entering the scoop can pass to the interior of the spring and then through the access opening 21 into the brake mechanism.

At any time it is desired to remove the air scoop 22, it is merely necessary to grasp the body 30 and force the arms 26 toward each other, the helical spring 42 being partially compressed, whereupon an outward pulling action on the body is exerted. The tapered flanges 27 engage the backing plate on opposite sides of its aperture 21 and assist in inward movement of the arms 26, and of the flanges 27 and fingers 28 toward each other, to the extent at which the flanges can shift through the backing plate aperture 21. Such removal is usually only necessary when brake adjustment is desired, access to the brake mechanism to be gained through the backing plate aperture 21. After adjustment has been completed, the air scoop 22 with the spring 42 therein can be reinserted in placed, with its forward end 24 and the forwardly tapering portion 51 of the spring facing in a forward direction on the backing plate 20.

I claim:

1. In a vehicle brake cooling apparatus: a brake mechanism including a non-rotatable backing plate; an air scoop having a body secured to said backing plate at one side thereof and an opening in its side wall, said body having an open forward end for the entry of air into the scoop which discharges through said opening into the brake mechanism on the other side of said backing plate; and a helical spring in said body forwardly of its opening for baffling passage of foreign substances to said opening, the turns of said spring being spaced apart substantially to permit air to flow between said turns and through said body to said opening.

2. In a vehicle brake cooling apparatus: a brake mechanism including a non-rotatable backing plate having an aperture therethrough; an air scoop having a body at one side of said backing plate, said body being provided with a longitudinal split extending from its forward end to its rearward end, opposed members extending from said body on opposite sides of said split into said aperture to secure said scoop to said plate with said split closely adjacent to said one side of said backing plate, said air scoop body having a substantially closed rearward end and an open forward end for the entry of air into the scoop which discharges between said members in the aperture into the brake mechanism on the other side of said backing plate; and a helical spring in said body forwardly of said members snugly engaging said body and tending to prevent foreign substances from passing between said members and into the brake mechanism, the turns of said spring being spaced apart substantially to permit air to flow between said turns and from said body and between said members into the brake mechanism.

3. In a vehicle brake cooling apparatus: a brake mechanism including a non-rotatable backing plate; an air scoop having a body secured to said backing plate at one side thereof and an opening in its side wall, said body having an open forward end for the entry of air into the scoop which discharges through said opening into the brake mechanism on the other side of said backing plate; and a conical helical spring in said body having a base portion secured to said body, a forward portion tapering forwardly from said base portion, and a rear portion tapering rearwardly from said base portion, the turns of said spring being spaced apart substantially to permit air to flow between said turns and through said body to said opening.

4. In a vehicle brake cooling apparatus: a brake mechanism including a non-rotatable backing plate having an aperture therethrough; an air scoop having a body at one side of said backing plate, said body being provided with a longitudinal split extending from its forward end to its rearward end, opposed members extending from said body on opposite sides of said split into said aperture to secure said scoop to said plate with said split closely adjacent to said one side of said backing plate, said air scoop body having a substantially closed rearward end and an open forward end for the entry of air into the scoop which discharges between said members in the aperture into the brake mechanism on the other side of said backing plate; and a conical helical spring in said body having a base portion secured to said body, a forward portion tapering forwardly from said base portion, and a rear portion tapering rearwardly from said base portion and snugly engaging said body, the turns of said spring being spaced apart substantially to permit air to flow between said turns to said members within said aperture.

5. In a vehicle brake cooling apparatus: a brake mechanism including a non-rotatable backing plate: an air scoop having a body secured to said backing plate at one side thereof and an opening in its side wall, said body having an open forward end for the entry of air into the scoop which discharges through said opening into the brake mechanism on the other side of said backing plate; a conical helical spring in said body having an intermediate base portion; fingers extending inwardly from said body and engaging said base portion forwardly thereof to retain said spring in said body; said spring including a portion tapering forwardly from said base portion and another portion tapering rearwardly from said base portion.

6. In a vehicle brake cooling apparatus: a brake mechanism including a non-rotatable backing plate; an air scoop having a body secured to said backing plate at one side thereof and an opening in its side wall, said body having an open forward end for the entry of air into the scoop which discharges through said opening into the brake mechanism on the other side of said backing plate; a helical spring in said body having turns spaced apart substantially to permit air to flow between said turns and through said body to said opening; and fingers extending inwardly from said body and engaging said spring to retain said spring in said body.

7. In a vehicle brake cooling apparatus: a brake mechanism including a non-rotatable backing plate having an aperture therethrough; an air scoop having a body at one side of said backing plate, said body being provided with a longitudinal split extending from its forward end to its rearward end, opposed members extending from said body on opposite sides of said split into said aperture to secure said scoop to said plate with said split closely adjacent to said one side of said backing plate, said air scoop body having a substantially closed rearward end and an open forward end for the entry of air into the scoop which discharges between said members in the aperture into the brake mechanism on the other side of said backing plate; a conical helical spring in said body having an intermediate base portion; fingers extending inwardly from said body and engaging said base portion forwardly thereof to retain said spring in said body; said spring including a forward portion tapering forwardly from said base portion and a rear portion tapering rearwardly from said base portion.

8. In vehicle brake cooling apparatus: a brake mechanism including a non-rotatable backing plate having an aperture therethrough on its lower portion through which a suitable tool can extend for brake adjusting purposes; an air scoop having a body of generally conical shape at one side of said plate, said body being provided with a longitudinal split extending from its forward end to its rearward end, arms extending from said body into said aperture to secure said scoop to said plate with said split closely adjacent to said one side of said body, said rearward end of said body being substantially closed and said forward end being open for the entry of air into the scoop which discharges between said arms in the aperture into the brake mechanism on the other side of said backing plate; a conical helical spring in said body having an intermediate base portion; fingers extending inwardly from said body and engaging said base portion forwardly thereof to retain said spring in said body; said spring including a forward portion tapering forwardly from said base portion and a rear portion tapering rearwardly from said base portion.

9. An air scoop for collecting and directing air through an aperture in a vehicle brake backing plate into the vehicle brake mechanism to cool the same, including a body having an open forward end through which air can enter the body and a substantially fully closed rearward end, opposed members extending from said body and adapted for insertion in the aperture to secure the scoop to the plate, said members being spaced apart to provide a passage communicating with the interior of said body to receive air therefrom for discharge into the brake mechanism, and a conical helical spring in said body having a base portion secured to said body, a forward portion tapering rearwardly from said base portion, the turns of said spring being spaced apart substantially to permit air to flow between said turns and through said body to said spaced apart members.

10. An air scoop for collecting and directing air through an aperture in a vehicle brake backing plate into the vehicle brake mechanism to cool the same, including a body having a longitudinal split extending from its forward end to its rearward end, the forward end of said body providing a large opening through which air can enter the body and the rearward end of said body being substantially fully closed, opposed members extending from said body on opposite sides of said split and adapted to be inserted in the aperture to secure the scoop to the plate, said members being spaced apart to provide a passage communicating with the interior of said body to receive air therefrom for discharge into the brake mechanism, and a helical spring in said body forwardly of said member snugly engaging said body and tending to prevent foreign substances from passing between said members, the turns of said spring being spaced apart substantially to permit air to flow between said turns and through said body to said passage.

11. An air scoop for collecting and directing air through an aperture in a vehicle brake backing plate into the vehicle brake mechanism to cool the same, including a body having a large open forward end through which air can enter the body and a substantially fully closed rearward end, opposed members extending from said body and adapted for insertion in the aperture to secure the scoop to the plate, said members being spaced apart to provide a passage communicating with the interior of said body to receive air therefrom for discharge into the brake mechanism, a helical spring in said body forwardly of said passage and having turns spaced apart substantially to permit air to flow between said turns and through said body to said passage, and fingers extending inwardly from said body and engaging said spring to retain said spring in said body.

12. An air scoop for collecting and directing air through an aperture in a vehicle brake backing plate into the vehicle brake mechanism to cool the same, including a generally conically shaped body having a longitudinal split extending from its large forward end to its small rearward end, said large forward end having a large opening through which air can enter the body and said rearward end being substantially fully closed, opposed arms extending from said body and adapted to be inserted in the aperture to secure the scoop thereto, said arms being spaced apart to provide a passage communicating with the interior of said body to receive air therefrom for discharge into the brake mechanism, a conical helical spring in said body having an intermediate base portion, fingers extending inwardly from said body and engaging said base portion forwardly thereof to retain said spring in said body, said spring including a forward portion tapering forwardly from said base portion and a rear portion tapering rearwardly from said base portion.

References Cited by the Examiner

UNITED STATES PATENTS

| | | | |
|---|---|---|---|
| 1,753,631 | 4/30 | Walters | 301—108 |
| 2,248,707 | 7/41 | Horn | 188—264 X |
| 2,286,584 | 6/42 | Simcox | 98—2 X |
| 3,023,858 | 3/62 | Yokom | 188—264 |

FOREIGN PATENTS

| | | |
|---|---|---|
| 297,617 | 9/28 | Great Britain. |
| 795,548 | 1/36 | France. |

OTHER REFERENCES

"Fighting Friction Heat," The AutoCar publication, pages 254–256, Aug. 7, 1936.

ARTHUR L. LA POINT, *Primary Examiner.*